J. W. BRYCE.
MASTER CLOCK.
APPLICATION FILED AUG. 24, 1920.

1,390,018.

Patented Sept. 6, 1921.

J. W. BRYCE.
MASTER CLOCK.
APPLICATION FILED AUG. 24, 1920.

1,390,018.

Patented Sept. 6, 1921.
4 SHEETS—SHEET 2.

Inventor
James W. Bryce
By his Attorneys
Kerr, Page, Cooper & Haywood

J. W. BRYCE.
MASTER CLOCK.
APPLICATION FILED AUG. 24, 1920.

1,390,018.

Patented Sept. 6, 1921.
4 SHEETS—SHEET 3.

Inventor
James W. Bryce
By his Attorney
Kerr, Page, Cooper & Hayward

J. W. BRYCE.
MASTER CLOCK.
APPLICATION FILED AUG. 24, 1920.

1,390,018.

Patented Sept. 6, 1921.
4 SHEETS—SHEET 4.

Inventor
James W. Bryce
By his Attorneys
Kerr, Page, Cooper & Hayward

UNITED STATES PATENT OFFICE.

JAMES W. BRYCE, OF BINGHAMTON, NEW YORK, ASSIGNOR TO THE INTERNATIONAL TIME RECORDING COMPANY OF NEW YORK, A CORPORATION OF NEW YORK.

MASTER-CLOCK.

1,390,018.      Specification of Letters Patent.      Patented Sept. 6, 1921.

Application filed August 24, 1920. Serial No. 405,607.

*To all whom it may concern:*

Be it known that I, JAMES W. BRYCE, a citizen of the United States of America, residing at Binghamton, in the county of Broome and State of New York, have invented certain new and useful Improvements in Master-Clocks, of which the following is a full, clear, and exact description.

This invention is an improvement in what is known in a synchronous clock system as the master clock; that is, a clock which, being carefully designed and constructed to keep accurate time, serves to control one or a plurality of secondary clocks, bringing them periodically into exact synchronism with itself, should they for any reason gain or lose time. In the commercial systems to which the invention is mainly applicable the master clock is called upon to do but little beyond keeping true time while loads of varying character are imposed upon the secondaries, making them liable to fast or slow running, which it is the function of the master clock to correct.

It results from the nature of the duties which a master clock, in such systems, is called upon to perform, that any accurate time-piece will be adequate for the purpose, but conditions of use and operation make it very desirable that the clock should always take care of itself. In other words, it should be self-controlling, its rewinding should in no wise impair or interfere with its time-keeping properties, and its capability for running for indefinite periods without attention or repair should be developed to the highest degree possible.

In the synchronizing clock system which I have devised, particularly designed and adapted for the control of time-recorders and like apparatus, I have found it necessary to design a specially constructed master clock to meet all of the conditions of use and operation which such systems impose, and the clock which I shall hereinafter describe is the commercial form of instrument which has been devised and adopted for general use as the best under all circumstances that the most careful experiments and tests have resulted in producing. The improvements, while not of a radical character, have been found to be thoroughly practical and fully capable of meeting the most exacting requirements.

These improvements consist: First, of a means for mounting or supporting the winding motor in the clock in a manner that will deaden the noise when it is operating to rewind the clock; second, of a means for imparting power to the clock driving train during the operation of winding up the weights which are employed as the source of motive power of the clock, whereby such train will be kept in operation during the interval of winding without resort to the supplementary springs which have heretofore been adopted for this purpose; and, third, in certain details of mechanism which distinguish the clock.

These improvements I have illustrated in the accompanying drawings, in which.

Figure 2:
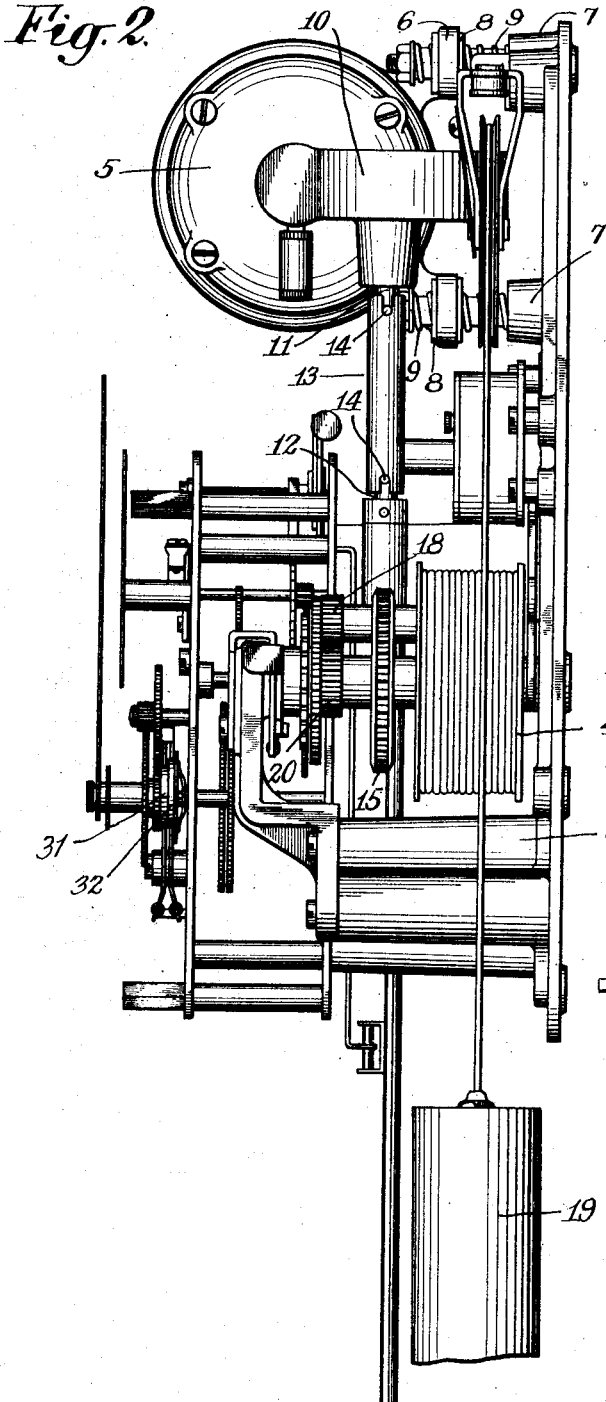
Fig. 2 is a side view of the same.

The entire clock mechanism is mounted on a bed plate 1. The clock train or mechanism proper, is contained in a frame 2 which is secured to the bed plate 1 by suitable posts 3, Fig. 2, while the winding drum 4 and the motor 5, together with the intermediate winding mechanism, are independently mounted on said bed plate, so that either the clock proper or the winding mechanism may be removed, if necessary, without interference one with the other.

The motor 5 is provided with legs integral with which are two cross-plates 6 with perforations near their ends, and these are placed over four standards or posts 7 covered with rubber tubing. Soft rubber washers or bushings 8, in or against the plates 6, are employed which, under the pressure of spiral springs 9 surrounding the posts 7, hold the motor in its proper and normal position.

Secured to one end plate of the motor or integral therewith is a box 10 containing a worm wheel engaging with the motor shaft, and this wheel drives a spindle 11, which imparts rotation to a spindle 12 by means of a cylindrical coupling 13 made preferably of some sound-deadening material, having longitudinal slots in its ends which engage with pins 14 in said two spindles. The spindle 12 engages with a worm wheel 15 connected to the winding drum 4, so that by the rotation of the motor this drum is revolved.

This connection compensates for any change in the position of the motor, which not being rigidly mounted, could not impart movement to the drum otherwise than by this or some equivalent flexible connection.

The plan adopted for mounting the motor operates as a sound insulator, so that when it is operated for rewinding the clock it does not make the disagreeable noise which it otherwise would.

Figure 5:
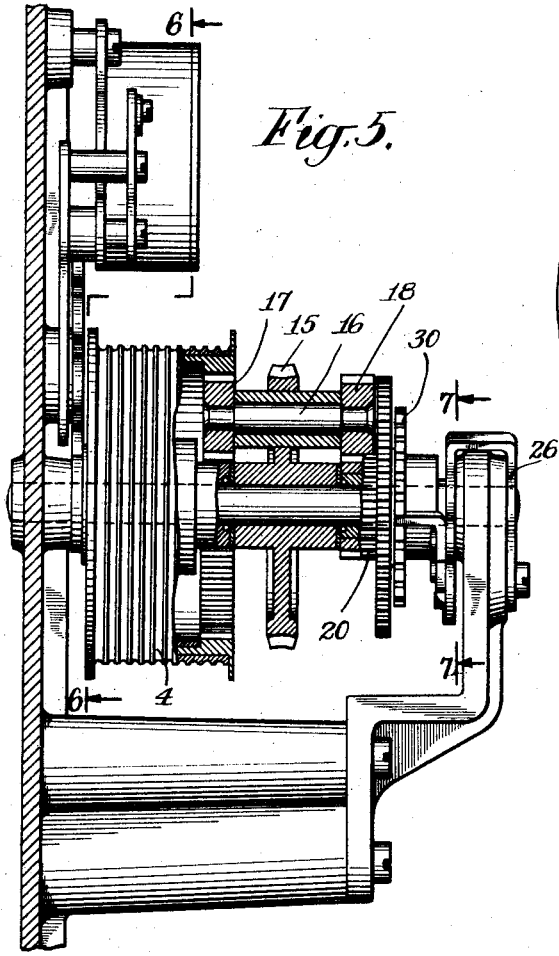
Fig. 5 is a side and part sectional view of the winding mechanism.

Referring now to Fig. 5: The worm wheel 15, revolved by the winding motor, is carried by the shaft of the winding drum 4. In the said wheel 15 is eccentrically mounted the bearing for a short shaft 16 that carries at one end a pinion 17 and at the other a similar pinion 18. The shaft 16 turns freely in its bearing and as the drum rotates under the influence of the weight 19, gear teeth on the inner edge of the drum engaging with the pinion 17, rotate said shaft and thereby impart rotation through pinion 18 to a pinion 20 on the shaft of the worm wheel 15 and constituting one member of the clock driving train. So long, therefore, as the worm wheel 15 is stationary, the clock is driven in this manner.

When the motor is started to wind the clock, worm wheel 15 is revolved and this carries around with it the shaft 16 with its two pinions, but in order to rotate the drum and thereby wind up or lift the weights, a counter-pressure must be brought to bear by the turning of the key or other winding mechanism on the pinion 18 geared to the clock train, which, being imparted to the train, keeps the clock in motion during the entire interval of winding. This force may be slightly greater than that imparted by the weights acting alone but not so much greater as to produce any appreciable effect upon the rate of the clock for the relatively short interval during which it is exerted.

Figure 6:
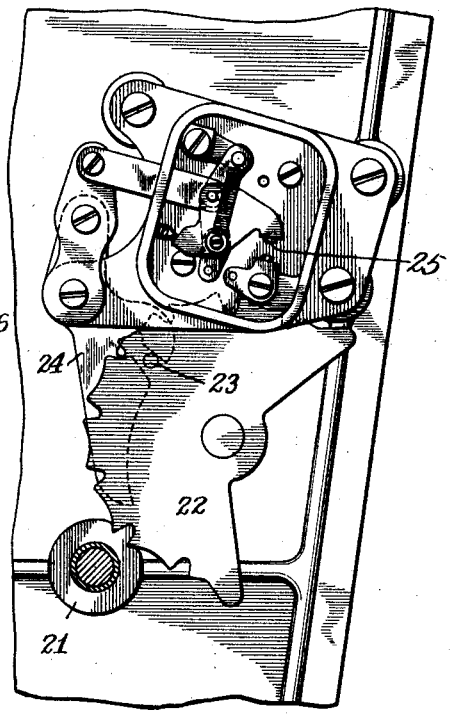
Fig. 6 is a sectional view of Fig. 5 on the line 6—6 of that figure.

At predetermined intervals the clock is automatically rewound, such intervals being usually forty-four hours apart. The means for doing this are not new to the present case but are shown in Fig. 6. In this figure a disk 21 on the winding drum has a single tooth that engages with teeth in a segmental plate 22 and by each complete revolution of the disk 21 this plate is advanced the space of one tooth.

The plate 22 carries a pin 23 that engages a pivoted lever 24 and as the clock runs down this lever is shifted to an extent that causes it to operate a switch with contacts 25 in the winding motor circuit. As the drum is rotated in the opposite direction by the motor the plate 22 is turned back to restore the lever 24 to its normal position, and in this movement said lever throws the switch again and opens said contacts when the weights have been wound. Under the circumstances a more specific description of this mechanism is not required, as it is a well know device in this art.

Figure 1:
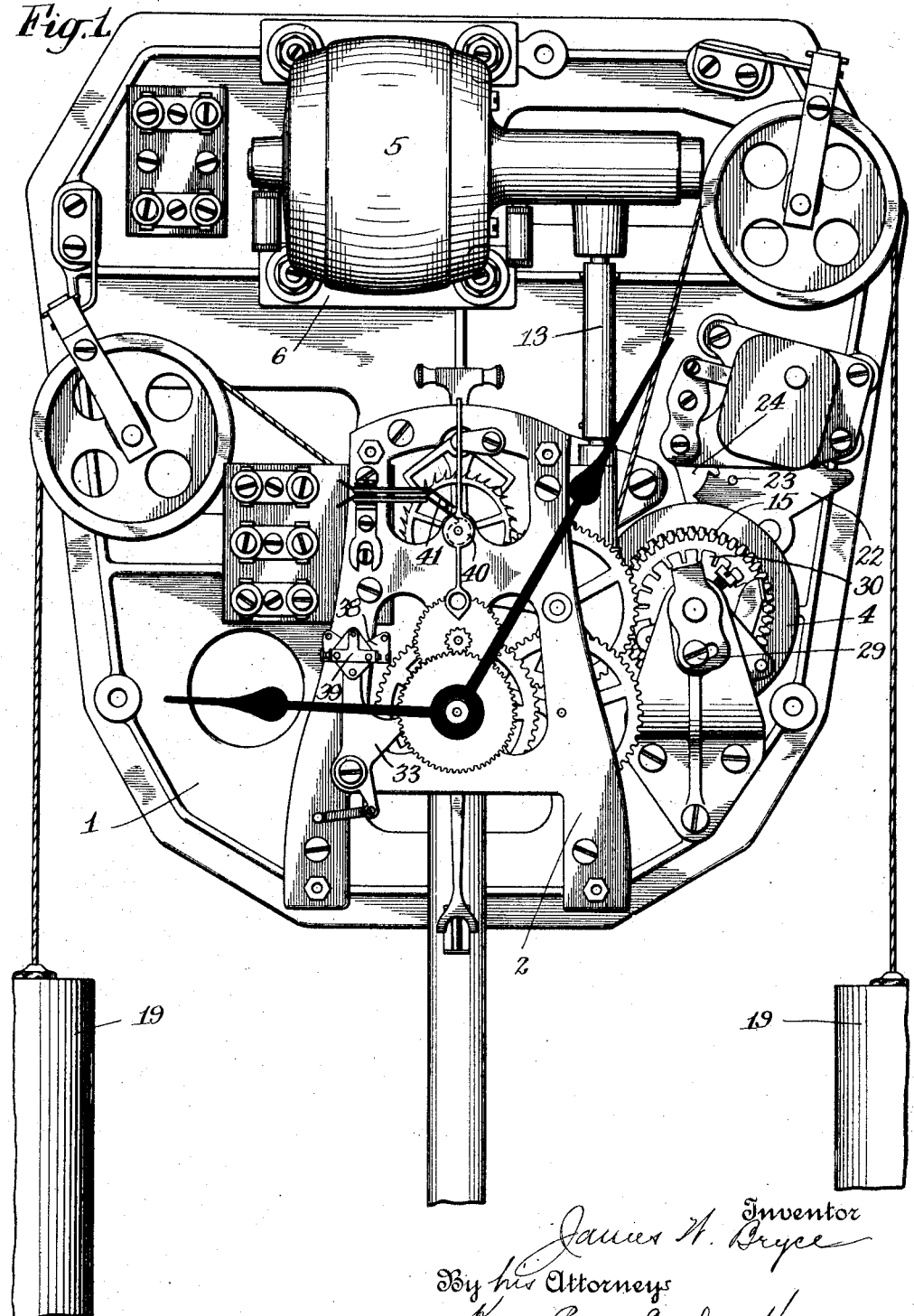
Figure 1 is a view in front elevation of the complete instrument.
Figure 7:
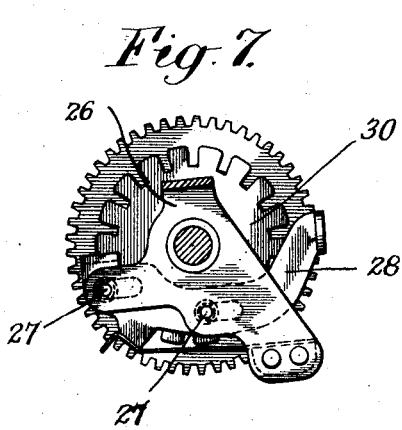
Fig. 7 is a sectional view on the line 7—7 of Fig. 5.

Should it become necessary for any reason to remove the clock train and its frame, the winding drum would be left free to rotate and the weights would immediately fall. It is necessary therefore to provide means for preventing this and such means is shown in Figs. 1, 5 and 7. On the shaft of the winding drum is mounted a double plate 26 having pins 27 that engage with slots in a lever 28 pivoted to a stationary support. Normally the outside part of plate 26 is held by a screw 29, Fig. 1, but by loosening this screw the plate may be turned by hand, by which means the lever 28 is depressed and its end brought into position to engage with the teeth of a wheel 30 on the drum shaft. The drum is in this way locked so that the cords or wires cannot unwind and allow the weights to drop.

Figure 3:
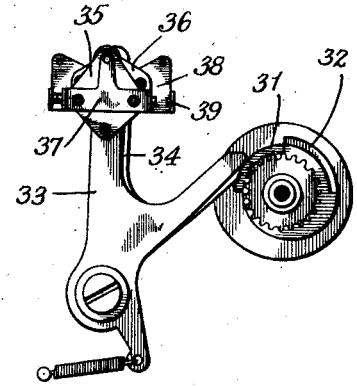
Fig. 3 is a detail of a switch mechanism.
Figure 4:
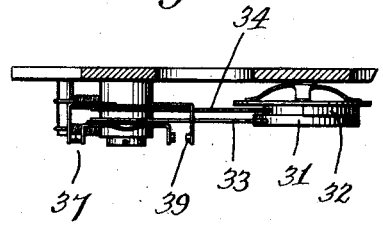
Fig. 4 is a top plan view of the same.
Figure 8:
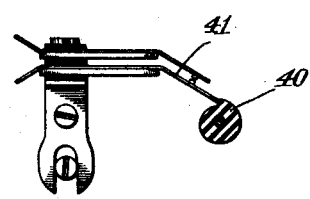
Fig. 8 is a detail of certain contacts.

The clock has certain special functions to perform, one of which is to connect a source of current with the circuit containing the secondary clocks for definite periods, usually fifteen minutes during each hour. Another function is to provide means to insure the proper operation of such devices as are employed for this purpose in case of interruption of the circuit during such periods and to render their operation more exact as to time, and these means are illustrated, chiefly, in Figs. 8 and 9. Referring to Figs. 3 and 4: On the hour shaft are two cams 31 and 32 that control the pivoted levers 33 and 34. The lever 33 carries an insulating plate 35 to which is attached a metal plate 37 carrying contact points. The other lever 34 carries an insulating plate 36 to which is secured a metal plate 38 also having two contact points between which plate 37 oscillates. Normally the plate 37 lies midway between the two contact points 39 but at fifteen minutes of the hour the lever 33 is shifted, throwing its left-hand contact onto the corresponding contact 39. In like manner at the even hour the lever 34 is shifted which throws the right-hand contact 39 onto the corresponding contact of the plate 37. In this way the source of current will be connected to line for fifteen minutes and then disconnected from line.

On the minute arbor is a cam 40 which at a given instant once each minute brings together two contact springs 41. The purpose of this will be explained by reference to the wiring diagrams.

Figure 9:
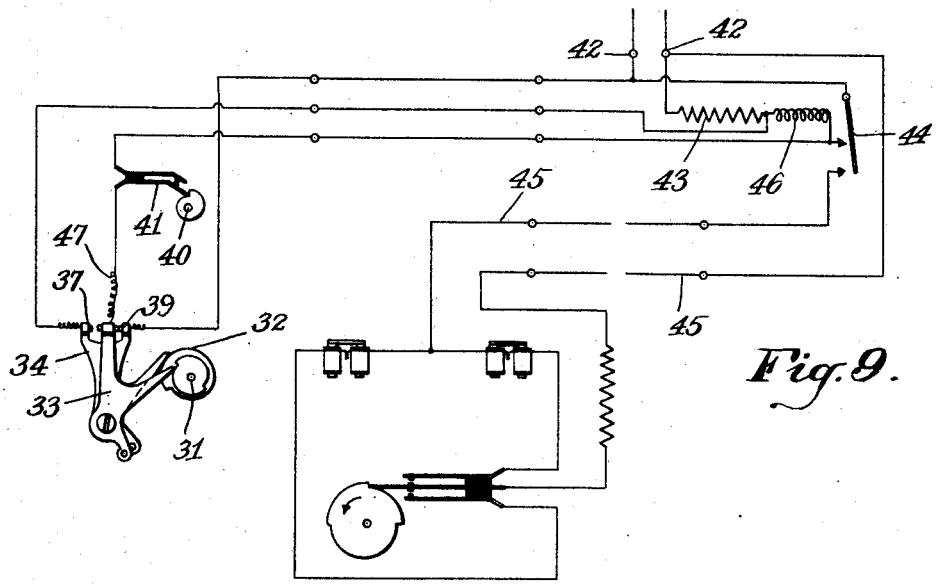
Figs. 9 and 10 are circuit or wiring diagrams.

In Fig. 9 the source of current is connected to terminals 42, and one of these terminals is connected, say, with the right-hand contact 39 and the other with the left-hand contact 39, through a resistance 43.

The contact on lever 33 is connected by a wire 47 to the two contacts 41 and thence to one terminal of a relay 46, the other terminal of which is connected to the right-hand terminal 42 through the resistance 43. The left-hand terminal 42 is also connected to the armature 44 of the relay 46, which controls a break in the clock circuit 45.

The contacts 41 controlled by the minute arbor close more exactly on time, or will probably do so, than the larger contacts controlled by levers 33 and 34. Let it be assumed therefore that the latter contacts are made a trifle before fifteen minutes of the hour and broken a trifle after the even hour. Nothing will result from such makes and breaks however, until the contacts 41 are closed on the exact time. When, therefore, contacts 41 are closed they find at fifteen minutes of the hour, the contact on lever 33 against the left-hand contact 39. Current from the source will therefore flow through the resistance 43 through the relay 46 and back to the opposite pole of the source through the connection 47 and the contact or lever 34. The relay being thus energized attracts its armature and connects the source directly with the line 45, but at the same time it completes the circuit through the resistance, the relay and the armature of the relay, so that the armature remains closed although the contacts 41 separate.

This condition exists until the lever 34 is shifted to bring the contact on lever 33 and the right-hand contact 39 together. This results in short-circuiting the relay coil, whereupon its armature falls back and breaks the circuit connection to line.

The great advantage of this arrangement resides in the fact that the contacts 41 operate every minute to pick up and restore the operative conditions, in case that any interruption of the circuit should occur during the fifteen minute period, and this is manifestly most important as a safeguard.

To adapt the clock for operation on either alternating or direct currents, is practically necessary, as in many systems one kind of current is available, perhaps during the day, while the factory plant is running, while the other is the only available source, as at night, when the municipal plant has to be depended upon. For this purpose I use the circuit arrangement shown in Fig. 10.

In this figure 48 is a relay across the circuit from the source, this relay having a very high inductance so that it is not appreciably affected by an alternating current. To a continuous current, however, it is fully responsive. If, therefore, the lever 33 be moved to the left, the current, if continuous, and hence energizing the relay 48, passes by the wire 49 to and through the resistance 43 and thence by wire 50 through the upper contact to one of the armatures 51 of the relay 48, thence to the left-hand contact 39, and thence through the contact on lever 34, back to the source. When contacts 41 are brought together the path for a current is completed through wire 47, contacts 41, the upper contacts of another armature 52 of relay 48, relay 46 and wire 55 to the source. The relay 46 attracts its armature 44 and this connects the source directly with the line through a wire 53 and the whole of an inductive resistance 54.

Figure 10:
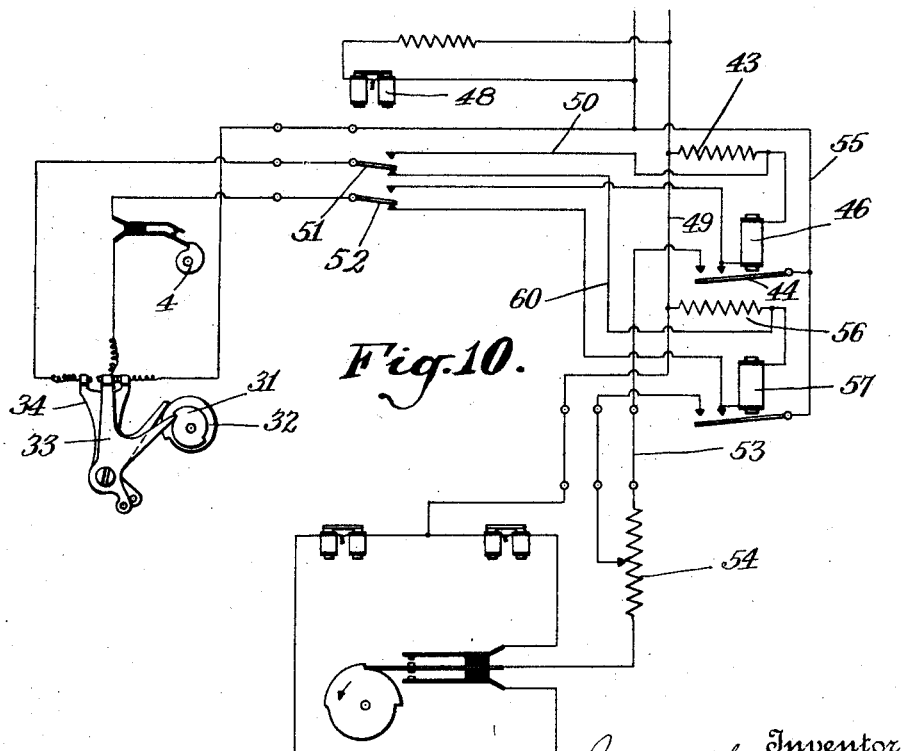

Should the current of the source, however, be alternating, the relay 48 is not energized, and the circuit from the left-hand contact 39 is made through the lower contact and armature 51 to a resistance 56 by a wire 60 and thence to the source, while the path from the lever 33 is made through contacts 41, the lower contact and armature 52 to a relay 57 and thence through resistance 56 to the source. When relay 57 is thus energized, it attracts its armature 58, which connects wire 55 to wire 59, connected to the intermediate part of the resistance 54. In all other respects than those noted the operation of the devices and circuits of Fig. 10 is the same as that of Fig. 9.

The special construction of the clock mechanism proper is not of the essence of this invention which resides in the several accessories to the clock which have been herein set forth. The circuits and circuit-controlling means herein described are not claimed herein as these will be made the subject of another application.

What I claim is:

1. The combination with the bed plate, a winding motor having supporting cross-plates, posts set in the bed plate passing through holes in said cross-plates, springs bearing on said cross-plates to hold the motor in position, winding mechanism on the bed plate and a flexible connection between the same and the motor shaft.

2. The combination with the bed plate, of stationary posts thereon, a winding motor having legs and cross plates which contain perforations through which said posts pass, spiral springs surrounding the posts and acting to hold the motor in position, intermediate washers of yielding material between the cross-plates and said springs, a winding mechanism mounted in the bed plate and a flexible connection between the same and the motor shaft.

3. In a self winding clock, the combination with a weight drum and means for winding the same, of differential gears between the clock train and the weight drum, through which power is imparted to the train while the clock is being rewound.

4. In a self winding clock, the combination of a weight drum, a shaft on which said drum is mounted, a winding gear on said shaft, a shaft carried by said gear wheel, and pinions thereon meshing respectively with the drum and with the clock train, whereby power is applied to the train while the drum is being rewound.

5. In a self winding clock, the combination with a weight drum, a shaft therefor, a worm wheel on and for turning said drum in rewinding the drum, a shaft mounted in said worm wheel and pinions thereon, one engaging with teeth on the inside of the drum, and the other with the clock train.

6. In a weight driven clock, the combination with a clock train and a winding drum, and winding mechanism independently mounted and geared together, of a normally locked pivoted plate on the winding drum, and means controlled thereby when released and turned to engage with and lock the said winding drum against rotation.

7. In a weight driven clock, the combination with a clock train, a winding drum and mechanism for operating the same, independently mounted and geared together, a plate mounted on the drum shaft, means for normally locking the same against movement, and a lever adapted to be thrown by the rotary movement of said plate into locking engagement with a wheel on the drum shaft.

In testimony whereof I hereto affix my signature.

JAMES W. BRYCE.